Figure 1:
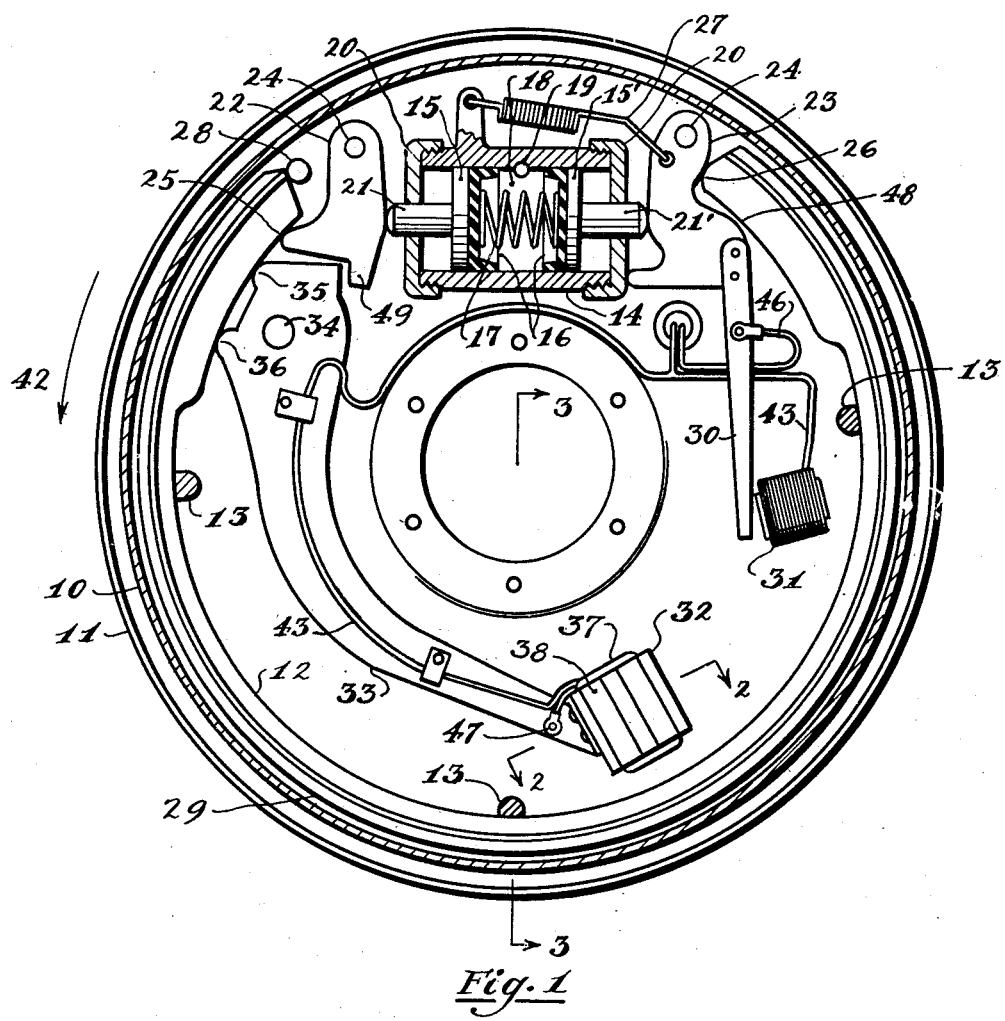

May 29, 1945. W. STELZER 2,377,277
BRAKE
Filed Oct. 29, 1943 2 Sheets-Sheet 1

INVENTOR.
William Stelzer

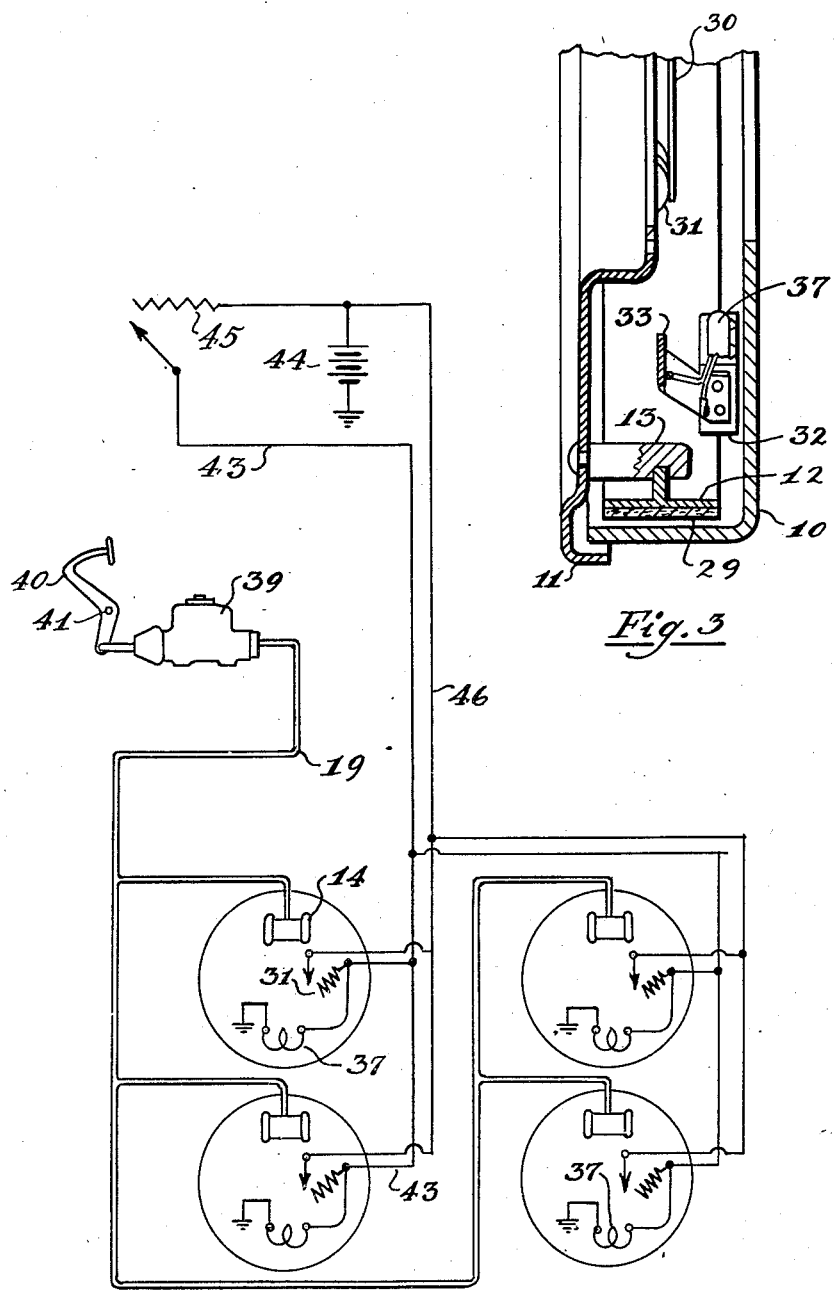

Patented May 29, 1945

2,377,277

UNITED STATES PATENT OFFICE 2,377,277

BRAKE

William Stelzer, Summit, N. J.

Application October 29, 1943, Serial No. 508,151

18 Claims. (Cl. 188—152)

The invention relates to brakes, and more particularly to an improved internal expanding self-energizing brake where the brake torque produced is in a pre-determined proportion to the pedal pressure exerted by the operator.

The novel braking system is particularly suited for use in motor vehicles, and makes use of two operating means so that if one fails the brakes may still be applied.

The object of my invention is to provide a brake where the brake torque produced is in a true relation to the manual force of application regardless of the variation in the coefficient of friction of the brake lining, and where it is equal in all the wheels. This important object is aimed at to improve the safety of the brakes, and to give the operator a true "pedal feel."

Another object is to provide hydraulic means for actuating the brake shoes and for opposing and gauging the torque reaction, and auxiliary means using a separate source of power to augment the brake torque until the latter is in proportion to the hydraulic pressure of the hydraulic actuating means.

Still another object is to make the auxiliary actuating means manually controllable so that in case of failure of the hydraulic system the brakes can still be applied.

Yet another object of my invention is to increase the radial pressure at the energizing end of the brake shoes in order to provide more equal wear of the friction surfaces.

Figure 2:
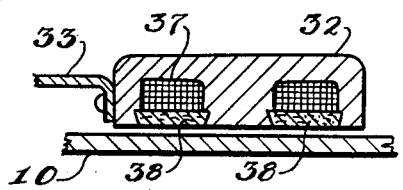

Other objects and advantages will be apparent from the following description considered in connection with the accompanying drawings submitted for the purpose of illustration and not to define the scope of the invention, reference being had for that purpose to the subjoined claims. In the drawings, wherein similar reference characters refer to similar parts throughout the several views:

Fig. 1 is a sectional view taken through a brake embodying my invention and showing the friction device in elevation;

Fig. 2, a sectional view taken through the electromagnet on lines 2—2 of Fig. 1;

Fig. 3, a fragmentary transverse sectional view of the brake taken on line 3—3 of Fig. 1; and Fig. 4, a diagram showing the hydraulic and electrical system and illustrating the inter-connection between a plurality of brakes of the vehicle.

Before explaining the present invention in detail, it is to be understood that the invention is not limited in its application to the details of construction and arrangement of parts illustrated in the accompanying drawings, since the invention is capable of other embodiments and of being practised or carried out in various ways. Also, it is to be understood that the phraseology or terminology employed herein is for the purpose of description and not limitation.

My improved brake, as illustrated in Figs. 1 and 3, may comprise a drum 10 mounted for rotation adjacent a support or backing plate 11, and a friction member or brake shoe 12 inside the drum arranged for frictional engagement. The brake shoe in this embodiment is of the semi-rigid type and consists of a single resilient ring forced by its own spring action to rest against stop pins 13 extending from backing plate 11. Between the open ends of the shoe is a hydraulic actuator cylinder 14 secured to the backing plate and comprising pistons 15 and 15' provided with seals 16 retained by a spring 17 in fluid chamber 18 which is in communication with the master cylinder through passage or line 19. End caps 20 serve as a guide for the piston rods 21 and 21' of pistons 15 and 15'. These piston rods engage articulating links or levers 22 and 23 pivoted on fixed anchor pins 24. Link 22 engages the energizing end of the brake shoe at 25, while link 23 is in contact with the heel of the brake shoe at 26. A spring 27 serves to urge link 23 in a retracted position. To provide a definite anchor point for the friction member when the vehicle travels backwards and the direction of rotation of the drum is reversed, a stop pin or anchor 28 is arranged to transmit the brake torque to the backing plate. The elements described so far form an independent hydraulic brake, which, however, would not produce a brake torque proportional to the hydraulic pressure in chamber 18 at varying coefficients of friction of lining 29 of the friction member.

In order to produce the results, which is an aim of this invention, an auxiliary electrical actuator is introduced to increase the pressure of the shoe against the drum. The mechanical linkage to expand shoe 12 by hydraulic pressure is so proportioned that with the highest possible coefficient of friction the brake torque obtained is less than the pre-determined brake torque obtained from the hydraulic and electrical operation combined. Link 23 serves to measure the brake torque relative to the hydraulic pressure in chamber 18, whereby its excursions are utilized by means of a contact arm 30 attached to and insulated against link 23 to regulate a rheostat 31 which in turn controls the current which may flow through the coil of an electro-magnet 32 secured to a laterally resilient actuator arm 33 swinging about a fixed anchor pin 34 and having cams 35 and 36 to urge the brake shoe against the drum. The electro-magnet clutch 32 as shown in Fig. 2 has grooves to accommodate a wire coil 37 retained by dove-tailed friction blocks 38. The magnet clutch, as shown more clearly in Fig. 3, is positioned adjacent the web of brake drum 10, so that when current is sent through the coil the magnet is attracted to the web and friction is produced.

Referring now to the diagram shown in Fig. 4, the hydraulic system comprises a master cylinder 39 operated by the operator through a brake pedal 40 pivoted at 41. From the master cylinder the hydraulic pressure line 19 leads to all actuating cylinders 14.

The electrical system illustrated in Fig. 4 comprises a battery 44 as a source of power, one side having been grounded to the chassis frame of the vehicle. In order to afford independent manual control of the electric system, I provide a manually controlled rheostat 45 normally held open and which when closed by the operator allows a current to flow through wire 43 to magnet coils 37. One side of the latter is grounded, whereby one terminal of the coil is connected to arm 33 at 47, as shown in Fig. 1.

Describing now the operation of the novel brake, and assuming that the operator depresses the brake pedal, the hydraulic pressure produced by master cylinder 39 is communicated to chamber 18 of the actuator cylinder so that piston 15 is forced to the left to articulate link 22 and urge shoe 12 into frictional engagement with the drum, the latter revolving in the direction of arrow 42. Due to spring 27 the actuation of link 23 is retarded, occurring only after the resistance offered link 22 has increased. The movement of piston 15' is further opposed by the brake torque produced as soon as the energizing end of shoe 12 is pressed against the drum by link 22. However, if the brake torque produced is not sufficient to oppose piston 15' through the medium of link 23, the latter is moved with piston 15' toward the right so that contact arm 30 comes in contact with rheostat 31 and closes the circuit to allow the flow of electric current from battery 44 through wire 46, contact arm 30, resistance 31, and through magnet coil 37, causing the magnet 32 to be attracted to the web of brake drum 10. The friction between magnet 32 and the brake drum urges power lever 33 to swing about anchor pin 34 in a counterclockwise rotation, whereby cam 35 presses against shoe 12 to increase the brake torque. As the contact arm 30 moves farther towards the right the resistance offered by the rheostat is reduced and the current transmitted to the magnet coil consequently increased, causing cam 35 to be applied with greater force. As soon as the brake torque has reached its predetermined magnitude where it opposes and balances the hydraulic pressure in chamber 18, link 23 and contact 30 assume a "holding position." In this position the brake torque, of which part is transmitted to pivot pin 24 and part to piston 15', counterbalances the hydraulic pressure in chamber 18 so that it holds piston 15' stationary. Supposing now that the operator releases the pedal and thereby reduces the hydraulic pressure in chamber 18, the existing high brake torque urges piston 15' towards the left through the medium of link 23, contact 30 thereby increasing the resistance of rheostat 31 to render magnet 32 less effective and to weaken the pressure of cam 35. If the brake pedal is released entirely and the pressure in chamber 18 relieved, shoe 12 is allowed to contract until it rests against stop pins 13 and the hydraulic pistons are pushed into the off position, the lower extremity of link 23 coming to rest against cap 20, and arm 30 being disconnected from resistance 31.

For braking in a reverse direction, where the drum revolves clockwise, the feature of controlling the brake torque to be in exact relation to the pedal pressure is dispensed with, because the speed of a vehicle when traveling in reverse is usually very low. In this operation, upon depression of the brake pedal, the left side becomes the heel of the shoe and transmits the brake torque to anchor pin 28, while the energizing end is at the right and is pressed against the drum by piston 15' through link 23. Since the shoe rotates with the drum a short distance until it engages pin 28, point 26 is not in contact with link 23 any more, instead, the latter engages the web of shoe 12 at 48. Contact arm 30 short circuits rheostat 31 so that magnet 32 becomes fully applied. To prevent a too severe brake application when the pedal is depressed only slightly, an interlocking abutment 49 is provided on link 22 to oppose the application of arm 33 in a clockwise rotation. The action of lever 33 during reverse braking is cancelled out only if the hydraulic circuit is functioning, in case of failure of the latter lever 33 may be actuated through operation of rheostat 45 by the operator, whereby the magnet becomes energized through wire 43, causing lever 33 to rotate clockwise and to actuate shoe 12 through cam 36.

It is apparent that the omission of link 22 and inactivity of piston 15 would not render the brake inoperative. These elements are not included to produce a torque reactive brake but merely to provide greater safety in case of failure of the electrical system.

While in the illustration I have shown a single brake shoe, it is apparent that any system of suitable brake shoes may be used, or the single shoe may be made in sections, therefore the term "friction member" is used to designate a shoe or band either used singly or as linked sections.

I claim:

1. A brake comprising a revolving member, friction means arranged to be engaged frictionally with said revolving member, power operated means for urging said friction means into engagement with said revolving member to produce a brake torque, manually actuated means to oppose the rotation of said friction means with said revolving member, and control means responsive to the peripheral movement of said friction means to control said power operated means.

2. A brake comprising a revolving member, friction means arranged to be engaged frictionally with said revolving member, power operated means for urging said friction means into engagement with said revolving member to produce a brake torque, a brake pedal operated by manual power, means to transmit the manual force of application of said brake pedal to oppose said brake torque by opposing rotation of said friction means with said revolving member, and control means responsive to the yield of said friction means relative to said manual force to control said power operated means.

3. A brake comprising a revolving member, friction means arranged to be engaged frictionally with said revolving member, power operated means for urging said friction means into engagement with said revolving member to produce a brake torque, fluid pressure producing means, a cylinder, a piston in said cylinder, fluid pressure transmitting means leading from said fluid pressure producing means to said cylinder, said cylinder and piston being arranged near said friction means, the fluid pressure in said cylinder urging said piston to oppose rotation of said friction means with said revolving member, and means responsive to the yielding peripheral movement of said friction member to control said power operated means to produce a brake torque which is in a pre-determined proportion to said fluid pressure.

4. The construction as claimed in claim 3, where said power operated means comprises an electro magnet arranged to be attracted to said revolving member, and lever means secured to said magnet and adapted to urge said friction means into engagement with said revolving member.

5. The construction as claimed in claim 3, where said power operated means comprises a lever for urging said friction means into engagement with said revolving member, an electromagnet mounted on said lever and arranged to be attracted to said revolving member, and a source of electric power to energize said electromagnet, said means responsive to the yielding peripheral movement controlling the current flowing through said electro magnet.

6. A brake comprising a revolving brake drum, friction means adjacent the inner periphery of said brake drum adapted for frictional braking engagement therewith, power operated means to force said friction means in a radial direction against said brake drum to produce a peripheral torque, force transmitting means operated by the operator to oppose the peripheral torque, control means responsive to said force transmitting means and to said peripheral torque, said force transmitting means being adapted to urge said control means to direct said power operated means to increase the force with which said friction means are pressed against said drum, and means to transmit the peripheral torque to urge said control means to cause a reduction in the force with which said friction means are pressed against said drum.

7. A brake comprising a revolving brake drum, friction means adjacent the inner periphery of said brake drum adapted for frictional braking engagement therewith, a power operated actuator to force said friction means radially against said brake drum, a source of power to control said actuator, a brake pedal operated by the operator, hydraulic fluid pressure transmitting means responsive to the peripheral torque generated by said friction means, whereby depression of said brake pedal causes said friction means to rotate a short distance in opposition to the peripheral torque, and control means responsive to the rotation of said friction means to increase the power of said actuator when the rotation is in opposition to the peripheral torque, and to decrease the power when the rotation is with the brake torque.

8. A brake comprising a revolving brake drum, a brake shoe of the self-energizing type adjacent the inner periphery of said brake drum adapted for frictional engagement therewith, said shoe being arranged to revolve with said drum a short distance, means operated by manual power to oppose the rotation of said shoe, an actuator lever to force said shoe radially against said brake drum, an electrically operated magnet clutch adjacent the web of said drum arranged to operate said actuator lever, and control means responsive to the rotation of said shoe to direct electric current to said magnet clutch to urge the latter to revolve with the drum and to thereby operate said actuator lever.

9. A brake comprising a revolving brake drum, a brake shoe of the self-energizing type adjacent the inner periphery of said drum and adapted for frictional engagement therewith, said shoe being arranged to revolve with said drum a short distance, a cylinder mounted near said shoe, a piston in said cylinder, fluid in said cylinder under pressure controlled by manual power to urge said piston to revolve said shoe in opposition to the brake torque, the fluid pressure in said cylinder being respresentative of the effort exerted by the operator, power operated means to force the energizing end of said shoe against said drum in a radial direction to produce a brake torque, and means responsive to the peripheral movement of said shoe to control the power of said power operated means so that the brake torque generated is in a pre-determined proportion to the manual effort exerted by the operator.

10. A brake comprising a revolving brake drum, a brake shoe of the self-energizing type adjacent the inner periphery of said drum and adapted for frictional engagement therewith, said shoe being arranged to be capable to revolve with said drum a short distance, a cylinder mounted near said shoe, a piston in said cylinder, fluid in said cylinder under pressure controlled by manual power exerted by the operator to urge said piston to revolve said shoe a short distance in opposition to the brake torque, an actuator lever arranged near said brake shoe to force the energizing end of said shoe in a radial direction against said drum to produce a brake torque, an electrically operated magnet clutch adjacent the web of said drum, and arranged to operate said actuator lever, and control means responsive to the rotation of said shoe to direct electric current to said magnet clutch to urge the latter to revolve with the drum and to thereby operate said actuator lever.

11. A brake comprising a revolving brake drum, friction means of the self-energizing type adjacent the inner periphery of said brake drum and adapted for frictional engagement therewith, said friction means being arranged to revolve with said drum a short distance, means operated by manual power to yieldingly oppose the rotation of said friction means, the force of opposition being representative of the force exerted by the operator, an actuator lever to force said friction means radially against said brake drum, an electrically operated magnet clutch mounted to said lever and arranged adjacent to said drum for frictional engagement therewith to operate said actuator lever, a source of electric power, a variable rheostat, and a contact arm operated in response to the peripheral movement of said friction means and cooperating with said rheostat to close the circuit and to increase the current from said source of electric power to said magnet clutch as said force of opposition revolves said friction means in opposition to the brake torque.

12. A brake comprising a revolving brake drum, a brake shoe of the self-energizing type adjacent to the inner periphery of said brake drum and adapted for frictional engagement therewith, said shoe being arranged to revolve with said drum a short distance, a hydraulic cylinder near the toe of said shoe, a piston in said cylinder, means for transmitting fluid under pressure to said cylinder by manual power to operate said piston, lever means intermediate said piston and the toe of said shoe to transmit a proportionate part of the brake torque generated by said shoe to said piston, a fixed pivot point for said lever means to receive the remainder of the brake torque, power operated means to force the energizing end of said shoe radially against said brake drum to produce a brake torque, and control means responsive to the movement of said lever means to control said power operated means to produce a brake torque that is in a predetermined proportion to the pressure of the fluid in said cylinder.

13. A brake comprising a revolving brake drum, a brake shoe of the self-energizing type adjacent to the inner periphery of said brake drum and adapted for frictional engagement therewith, said shoe being arranged to revolve with said drum a short distance, means operated by manual energy to apply a radial force against the energizing end of said shoe to engage the latter frictionally with said drum to produce a brake torque, means operated by manual effort to oppose the rotation of said shoe due to the generated brake torque, power operated means to increase the radial pressure between said brake shoe and drum to increase the generated brake torque, and control means responsive to the rotation of said brake shoe to control said power operated means to produce a brake torque that is in a pre-determined proportion to the manual effort opposing the brake torque.

14. The construction as claimed in claim 13, where said means operated by manual energy to apply a radial force against the energizing end of said shoe is so proportioned that the brake torque produced with the highest possible coefficient of friction is not greater than the desired brake torque which is in a pre-determined proportion to the manual effort opposing it.

15. The construction as claimed in claim 13, where said means operated by manual energy to apply a radial force against the energizing end of said shoe is of such a proportion as to provide partial braking to serve as a safeguard in case of failure of said power operated means.

16. In a vehicle wheel brake, a rotatable member to be braked in either direction, a friction member arranged to be engaged therewith and being free to revolve with said rotatable member a short distance, a cylinder, a piston in said cylinder arranged to oppose the brake torque generated by said friction member, means operated by the operator to transmit fluid under pressure to act on said piston, a lever having a fixed pivot intermediate said friction member and said piston to transmit only part of the brake torque to said piston, the other part reacting against said pivot, said lever having an extension adapted to press said friction member radially against said rotatable member after said friction member has yielded to the action of said piston, power operated means to press said friction member radially against said rotatable member, and control means responsive to the movement of said lever to control said power operated means.

17. The construction as claimed in claim 16, and a fixed anchor pin to receive the brake torque when braking in reverse direction.

18. In a braking system for a vehicle, a plurality of brakes, each brake comprising a revolvable member, a friction device arranged to be engaged therewith and adapted to rotate a short distance, means operated by manual effort to oppose the rotation due to the brake torque of said friction device, an actuator lever arranged to force said friction device radially against said revolvable member, an electrically operated magnet clutch connected to said lever and adapted for frictional engagement with said revolvable member to actuate said actuator lever, control means responsive to the rotation of said friction device to direct an electric current to said magnet clutch, and means directly operatable by the operator to direct an electric current to said magnet clutch by shunting said control means so that the brake is operatable even if said means operated by manual effort to oppose the rotation fails.

WILLIAM STELZER.